United States Patent
Traa et al.

(10) Patent No.: US 12,291,229 B2
(45) Date of Patent: May 6, 2025

(54) METHOD FOR DETECTING OBJECTS IN AUTOMOTIVE-GRADE RADAR SIGNALS

(71) Applicant: Symeo GmbH, Neubiberg (DE)

(72) Inventors: Johannes Traa, Medford, MA (US); Andrew Schweitzer, Cambridge, MA (US); Atulya Yellepeddi, Medford, MA (US)

(73) Assignee: Symeo GmbH, Neubiberg (DE)

( * ) Notice: Subject to any disclaimer, the term of this patent is extended or adjusted under 35 U.S.C. 154(b) by 76 days.

(21) Appl. No.: 17/587,899

(22) Filed: Jan. 28, 2022

(65) Prior Publication Data
US 2022/0242443 A1    Aug. 4, 2022

Related U.S. Application Data (60) Provisional application No. 63/143,154, filed on Jan. 29, 2021.

(51) Int. Cl.
*B60W 60/00* (2020.01)

(52) U.S. Cl.
CPC ..... *B60W 60/001* (2020.02); *B60W 2420/408* (2024.01); *B60W 2554/4041* (2020.02);
(Continued)

(58) Field of Classification Search
CPC ........... B60W 60/001; B60W 2420/52; B60W 2554/4041; B60W 2554/4048
See application file for complete search history.

(56) References Cited

U.S. PATENT DOCUMENTS

| 5,495,249 A | 2/1996 | Chazelle |
| 9,599,702 B1 * | 3/2017 | Bordes ................... G01S 13/18 |

(Continued)

FOREIGN PATENT DOCUMENTS

| CN | 110501684 A * | 11/2019 | ............ G01S 13/58 |
| JP | 2000258528 | 9/2000 | |

(Continued)

OTHER PUBLICATIONS

English Translation of CN-110501684-A (Year: 2023).*

(Continued)

*Primary Examiner* — Rami Khatib
*Assistant Examiner* — Gabriel Joseph Rene Lambert
(74) *Attorney, Agent, or Firm* — Schwegman Lundberg & Woessner, P.A.

(57) ABSTRACT

A method includes an operation to collect radar signals reflected from objects in a field of view. Range-angle-doppler bins representing three-dimensional objects in the field of view are formed. A local median operation is used across a selected dimension of the range-angle-doppler bins to eliminate background noise in the range-angle-doppler bins. Low energy peak regions are masked by removing radial velocity values in the selected dimension to form a sparse range-angle two-dimensional grid. The radar signals reflected from objects in the view of view are processed to extract reflection point detections. Reflection point detections are tracked in accordance with short-term filter rules to form tracked reflection point detections. The tracked reflection point detections are formed into clusters. The clusters are processed with long-term filter rules.

18 Claims, 10 Drawing Sheets

(52) U.S. Cl.
CPC ............... *B60W 2554/4048* (2020.02); *B60W 2554/4049* (2020.02)

(56) References Cited

U.S. PATENT DOCUMENTS

| | | | | |
|---|---|---|---|---|
| 2011/0085702 | A1* | 4/2011 | Nevatia | G06F 18/231 382/103 |
| 2016/0084941 | A1* | 3/2016 | Arage | G01S 7/2921 342/91 |
| 2016/0103213 | A1 | 4/2016 | Ikram | |
| 2017/0053167 | A1* | 2/2017 | Ren | G06T 7/246 |
| 2018/0231636 | A1 | 8/2018 | Maher et al. | |
| 2020/0143656 | A1 | 5/2020 | Li | |
| 2020/0174096 | A1* | 6/2020 | Cho | G01S 7/414 |
| 2021/0011147 | A1* | 1/2021 | Va | G01S 7/415 |
| 2021/0116540 | A1* | 4/2021 | Santra | G01S 7/415 |
| 2021/0190902 | A1* | 6/2021 | Amihood | G01S 7/358 |
| 2021/0231791 | A1* | 7/2021 | Oh | G01S 7/295 |
| 2021/0286923 | A1* | 9/2021 | Kristensen | G01S 7/412 |
| 2022/0084229 | A1* | 3/2022 | Guizilini | G06T 3/18 |
| 2022/0128685 | A1* | 4/2022 | Longman | G01S 13/583 |
| 2022/0196798 | A1* | 6/2022 | Chen | G01S 13/89 |

FOREIGN PATENT DOCUMENTS

| | | |
|---|---|---|
| JP | 2002048866 | 2/2002 |
| JP | 2003028953 | 1/2003 |
| JP | 2004251774 | 9/2004 |
| JP | 2006516736 | 7/2006 |
| JP | 2006214766 | 8/2006 |
| JP | 2011174872 | 9/2011 |
| JP | 2014006069 | 1/2014 |
| WO | 2020006531 | 1/2020 |
| WO | 2020006533 | 1/2020 |
| WO | WO-2020/113160 A2 | 6/2020 |
| WO | WO-2022165211 A1 | 8/2022 |

OTHER PUBLICATIONS

United States Patent and Trademark Office, International Search Report and Written Opinion for PCT/US2022/014360, Apr. 28, 2022, 16 pages.

"European Application Serial No. 22746716.4, Response to Communication pursuant to Rules 161(2) and 162 EPC filed Feb. 15, 2024".

"International Application Serial No. PCT/US2022/014360, International Preliminary Report on Patentability mailed Aug. 10, 2023", 8 pgs.

"Japanese Application Serial No. 2023-546121, Notification of Reasons for Refusal mailed Dec. 2, 2024", w English Translation, 8 pgs.

"Japanese Application Serial No. 2023-546121, Response filed Feb. 14, 2025 to Notification of Reasons for Refusal mailed Dec. 2, 2024", w/ English Claims, 9 pgs.

"European Application Serial No. 22746716.4, Extended European Search Report mailed Nov. 11, 2024", 11 pgs.

Schachter, Bruce, "Unification of automatic target tracking and automatic target recognition", Proc. SPIE 9090, Automatic Target Recognition XXIV, 909002 (Jun. 13, 2014); doi: 10.1117 12.2048595 [abstract only], (Jun. 13, 2014), 17 pgs.

* cited by examiner

METHOD FOR DETECTING OBJECTS IN AUTOMOTIVE-GRADE RADAR SIGNALS

CROSS-REFERENCE TO RELATED APPLICATIONS

This application claims priority to U.S. Provisional Patent Application Ser. No. 63/143,154, filed Jan. 29, 2021, the contents of which are incorporated herein by reference. This application is related to U.S. Provisional Patent Applications No. 63/123,403 entitled, "METHOD, APPARATUS AND RADAR SYSTEMS FOR TRACKING OBJECTS" filed on Dec. 9, 2020, which is hereby incorporated by reference in its entirety.

FIELD OF THE DISCLOSURE

The present disclosure relates to techniques for detecting objects up sampled in automotive-grade radar signals. More particularly, the disclosure describes background estimation and peak region validation in a radar environment and subsequent filtering techniques.

BACKGROUND

An autonomous vehicle (AV) is a vehicle that is configured to navigate roadways based upon sensor signals output by sensors of the AV, wherein the AV navigates the roadways without input from a human. The AV is configured to identify and track objects (such as vehicles, pedestrians, bicyclists, static objects, and so forth) based upon the sensor signals output by the sensors of the AV and perform driving maneuvers (such as accelerating, decelerating, turning, stopping, etc.) based upon the identified and tracked objects.

The use of automation in the driving of road vehicles such as cars and truck has increased as a result of advances in sensing technologies (e.g., object detection and location tracking), control algorithms, and data infrastructures. By combining various enabling technologies like adaptive cruise control (ACC), lane keeping assistance (LKA), electronic power assist steering (EPAS), adaptive front steering, parking assistance, antilock braking (ABS), traction control, electronic stability control (ESC), blind spot detection, GPS and map databases, vehicle to vehicle communication, and other, it becomes possible to operate a vehicle autonomously (i.e., with little or no intervention by a driver).

In the field of autonomous or quasi-autonomous operation of vehicles such as aircrafts, watercrafts or land vehicles, in particular automobiles, which may be manned or unmanned, sensing the surrounding of the vehicle as well as tracking objects in the surrounding of the vehicle may be considered to be crucial for sophisticated functionalities. These functionalities may range from driver assistance systems in different stages of autonomy up to full autonomous driving of the vehicle.

In the certain environments, a plurality of different types of sensors for sensing the surrounding of a vehicle are used, such as monoscopic or stereoscopic cameras, light detection and ranging (LiDAR) sensors, and radio detection and ranging (radar) sensors. The different sensor types comprise different characteristics that may be utilized for different tasks.

Embodiments of the present disclosure concern aspects of processing measurement data of radar systems, whereby the computationally heavy fusion of sensor data (e.g., range, angle and velocity) can be mitigated. This is particularly useful, when one parameter array needs to be populated before processing another, such as, range and velocity.

Radar systems typically provide measurement data, in particular range, doppler, and/or angle measurements (azimuth and/or elevation), with high precision in a radial direction. This allows one to accurately measure (radial) distances as well as (radial) velocities in a field of view of the radar system between different reflection points and the (respective) antenna of the radar system.

Radar systems transmit (emit) radar signals into the radar system's field of view, wherein the radar signals are reflected off of objects that are present in the radar system's field of view and received by the radar system. The transmission signals are, for instance, frequency modulated continuous wave (FMCW) signals. Radial distances can be measured by utilizing the time-of-travel of the radar signal, wherein radial velocities are measured by utilizing the frequency shift caused by the doppler effect.

By repeating the transmitting and receiving of the radar signals, radar systems are able to observe the radar system's field of view over time by providing measurement data comprising multiple, in particular consecutive, radar frames.

An individual radar frame may for instance be a range-azimuth-frame or a range-doppler-azimuth-frame. A range-doppler-azimuth-elevation-frame would be also conceivable, if data in the elevation-direction is available.

Further, radar systems with chirp sequences that have a frequency offset and/or time offset between the chirps can be used. In that case, the resulting radar frame has a fast-time axis, a slow-time axis and azimuth/elevation angle. For an evenly spaced chirp sequence with the same starting frequency for each chirp, the range axis corresponds to the fast-time axis and the Doppler axis corresponds to the slow-time axis. Subsequently, the range/Doppler notation is used, but the techniques work for fast-time and slow-time notation as well.

In each of the multiple radar frames a plurality of reflection points which may form clouds of reflection points can be detected. However, the reflection points or point clouds, respectively, in the radar frames do not contain a semantic meaning per se. Accordingly, a semantic segmentation of the radar frames is necessary in order to evaluate ("understand") the scene of the vehicle's surrounding.

The segmentation of a radar frame means that the single reflection points in the individual radar frames are assigned a meaning. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

Generally, radar systems observe specular reflections of the transmission signals that are emitted from the radar system, since the objects to be sensed tend to comprise smoother reflection characteristics than the (modulated) wavelengths of the transmission signals. Consequently, the obtained radar frames do not contain continuous regions representing single objects, but rather single prominent reflection points (such as the edge of a bumper), distributed over regions of the radar frame.

Radar data form of 3-dimensional, complex-valued array (a.k.a. radar cube) with dimensions corresponding to azimuth (angle), radial velocity (doppler), and radial distance (range). Taking the magnitude in each angle-doppler-range bin describe how much energy the radar sensor sees coming from that point in space (angle and range) for that radial velocity.

The problem in the art arises from the vast volume of energy data populating the cube. This makes processing the data in a real time environment implausible. One solution presently found in the art includes processing one dimension (i.e., parameter) at a time. However, this is not useful for particular applications, such as, 3-d cube processing.

There is a demonstrated need in the art for background estimation and peak estimation while substantially preserving the 3-dimensional radar cube.

SUMMARY OF THE DISCLOSURE

A method is disclosed for compressing data in a radar cube while preserving salient information. Peak validation and peak region masking is used to enhance and isolate range-angle-doppler bins corresponding to objects in the scene. Noise background is estimated using an efficient (approximate) local median operation and this is used to mask out bins that don't belong to objects in the scene. Peak region validation can then be performed on peaks that are located in the thresholded cube. Low-energy peak regions are masked out. This is executed by removing one dimension of the cube (preferably radial velocity) with a median operation to avoid having to compute expensive background statistics in 3D. The result is an efficiency 2D local median applied on a sparse range-angle grid and then up-sampled with bilinear interpolation.

According to one aspect, the present disclosure applies a first median operator to one dimension of a radar cube thereby mitigating further computational processing.

According to another aspect, a second median operator is applied to the two or more remaining dimensions.

According to one or more aspects, the result is up-sampled.

According to one or more aspects, the up-sampling is performed using bilinear interpolation.

According to some aspects, the first median operator is applied to radial velocity.

According to some aspects, the second median operator is applied to sparse range-angle grid.

According to one aspect, the method comprises or can be used for or with peak region validation.

According to one aspect, the method comprises or can be used for or with threshold masking.

According to one aspect, the method comprises or can be used for or with background estimation.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Similarly, for the purposes of clarity and brevity, not every component may be labeled in every drawing.

For a fuller understanding of the nature and advantages of the present invention, reference is made to the following detailed description of preferred embodiments and in connection with the accompanying drawings, in which.

DETAILED DESCRIPTION

The present disclosure relates to techniques for detecting objects two-dimensional in automotive-grade radar signals. More particularly, the disclosure describes background estimation and peak region validation in a radar environment. During radar signal processing, background subtraction tends to be overly aggressive and is computationally intensive. One method disclosed herein runs a median operation on one dimension of a radar cube.

This results in the removal of one dimension from computation in calculating the background statistics, e.g., 3D to 2D or 4D to 3D as may be used in multidimensional processing. In a 3D to 2D example, doppler-velocity can be removed using the median operation. A local median 2D can then be applied on a sparse range-angle grid. The result can then be up-sampled with bilinear interpolation. Additionally, spurious peaks can be eliminated by a validation step.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

The present disclosure generally relates to Millimeter Wave Sensing, while other wavelengths and applications are not beyond the scope of the invention. Specifically, the present method pertains to a sensing technology called Frequency Modulated Continuous Waves (FMCW) RADARS, which is very popular in automotive and industrial segments.

Figure 1A:
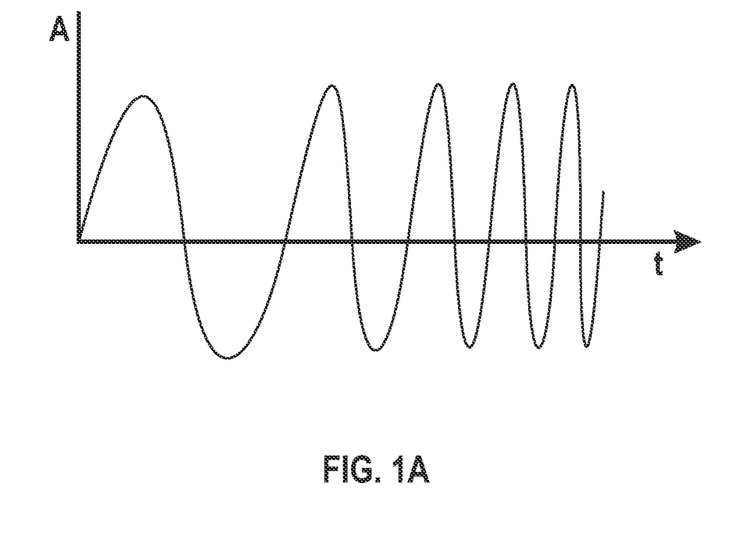
FIGS. 1A and 1B depict an exemplary radar chirp as a function of time, as known in the art.
Figure 1B:
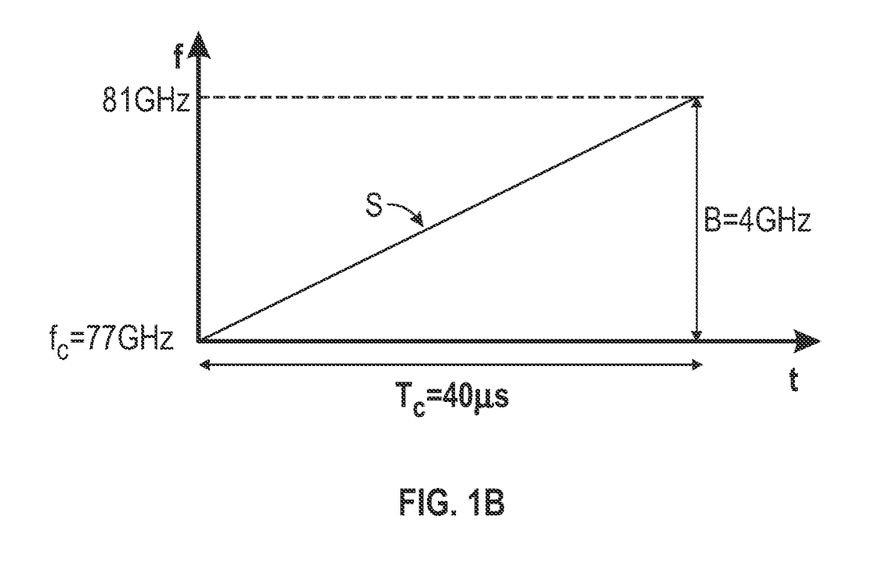

FMCW radar measures the range, velocity, and angle of arrival of objects in front of it. At the heart of an FMCW radar is a signal called a chirp. FIGS. 1A and 1B depict an exemplary radar chirp as a function of time, as known in the art.

A chirp is a sinusoid or a sine wave whose frequency increases linearly with time. FIG. 1A shows this as an amplitude versus time, or A-t plot. Turning to FIG. 1B, the chirp starts as a sine wave with a frequency of fc and gradually increase its frequency ending up with a frequency of fc plus B, where B is the bandwidth of the chirp. The frequency of the chirp increases linearly with time, linear being the operative word. So, in the f-t plot, the chip would be a straight line with a slope S.

Thus, the chirp is a continuous wave whose frequency is linearly modulated. Hence the term frequency modulated continuous wave or FMCW for short.

Figure 2:
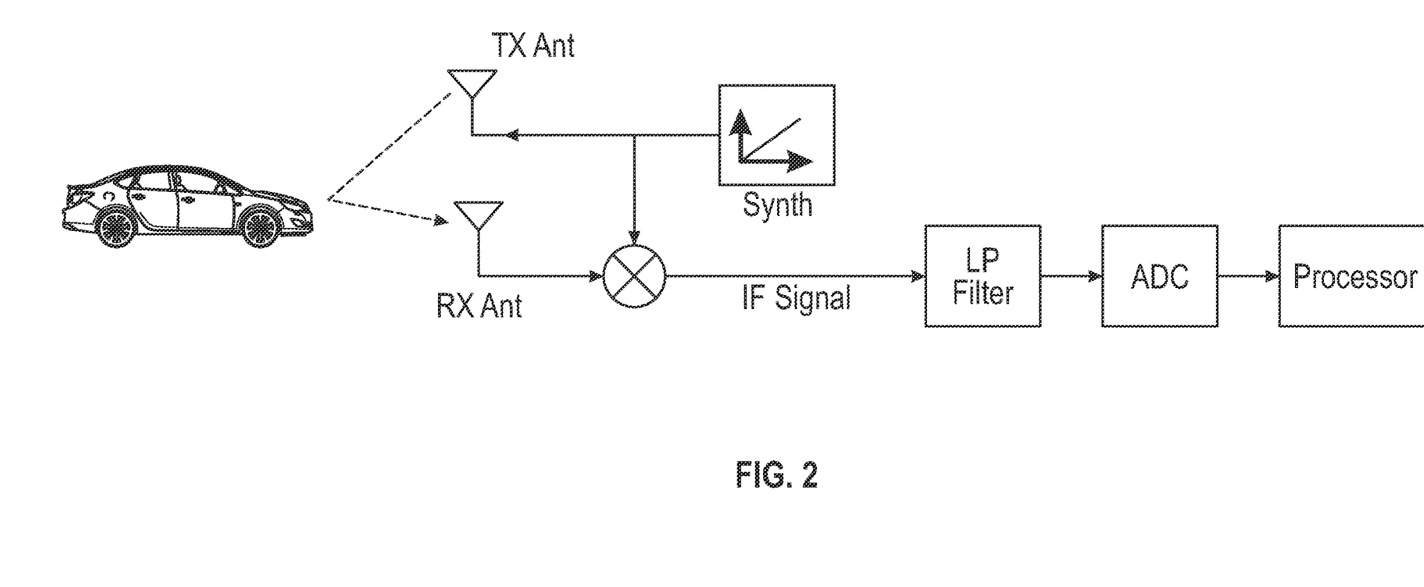
FIG. 2 depicts an exemplary auto-grade radar system, according to some embodiments.

FIG. 2 depicts an exemplary auto-grade radar system, according to some embodiments. It is represented as a simplified block diagram of an FMCW radar with a single TX and a single RX antenna. In one or more embodiments, the radar operates as follows. A synthesizer generates a chirp. This chirp is transmitted by the TX antenna. The chirp is then reflected off an object, such as, a car. The reflected chirp is received at the RX antenna. The RX signal and the TX signal are mixed at a mixer.

The resultant signal is called an intermediate (IF) signal. The IF signal prepared for signal processing by low-pass (LP) filtering and sampled using an analog to digital converter (ADC). The significance of the mixer will now be described in greater in detail.

Figure 3A:
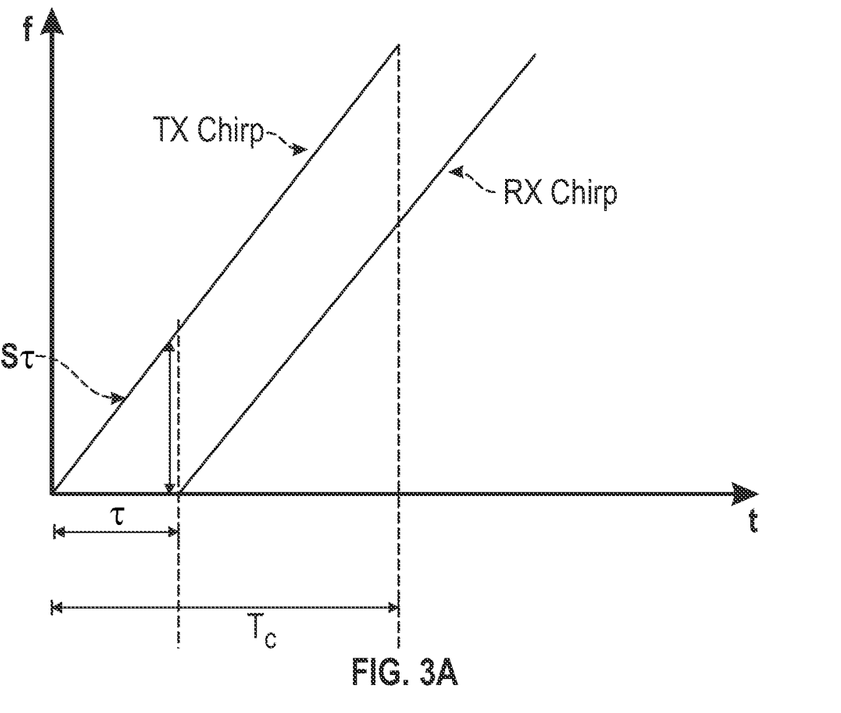
FIGS. 3A and 3B illustrate the frequency difference in exemplary send and receive radar chirps, according to some embodiments.
Figure 3B:
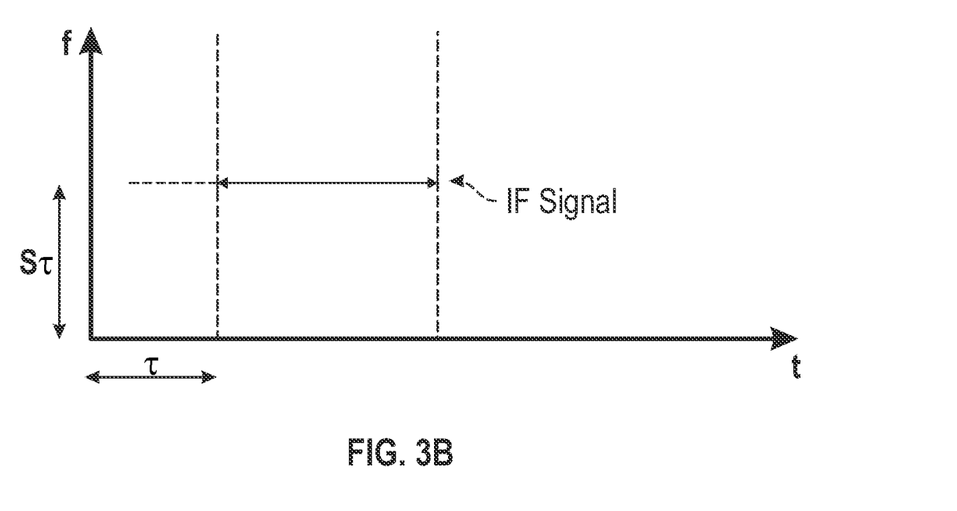

FIGS. 3A and 3B illustrate the frequency difference in exemplary send and receive radar chirps, according to some embodiments. In one or more embodiments, this difference is estimated using a mixer. A mixer has two inputs and one output, as is known in the art. If two sinusoids are input to the two input ports of the mixer, the output of the mixer is also a sinusoid as described below.

The instantaneous frequency of the output equals the difference of the instantaneous frequencies of the two input sinusoids. So, the frequency of the output at any point in time would be equal to the difference of the input frequencies of two time-varying sinusoids at that point in time. Tau, t, represents the round-trip delay from the radar to the object and back in time. It can also be expressed as twice the distance to the object divided by the speed of light. A single object in front of the radar produces an IF signal with a constant frequency given by S2d/c.

Figure 4:
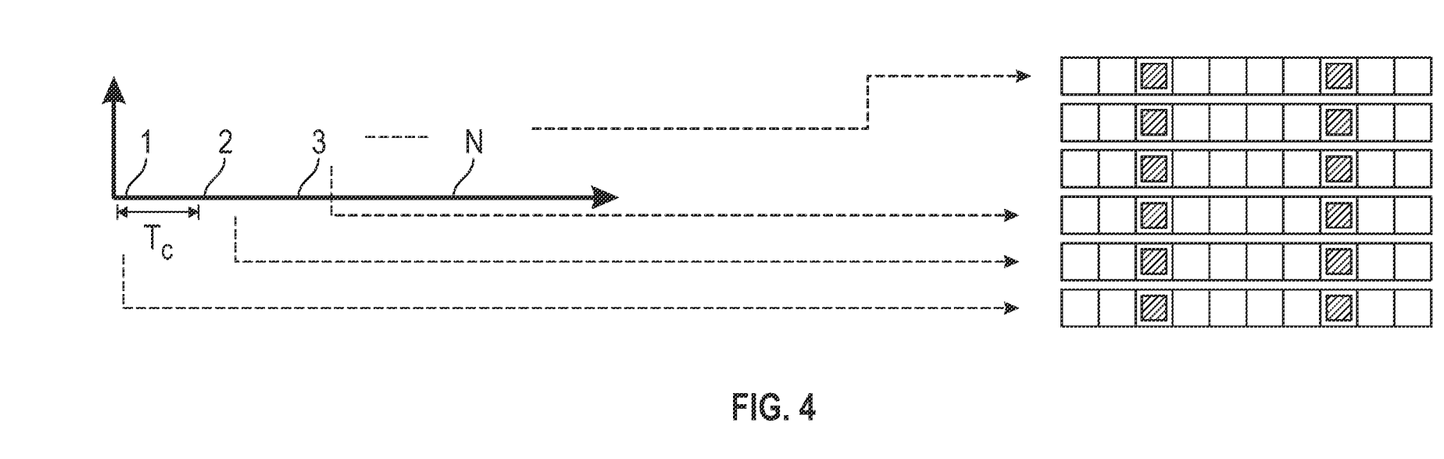
FIG. 4 illustrates an exemplary two-dimensional range array being populated, according to some embodiments.

FIG. 4 illustrates an exemplary two range matrix being populated by a radar frame, according to some embodiments. A radar frame (left) has a time $T_F$ and comprises a plurality of chirps, 1-N, each separated in time by $T_C$.

Each row corresponds to one chirp. That is, for every chirp there is a row in the chirp index, i.e., N rows for N chirps. Each box in a particular row represents one ADC sample. Accordingly, if each chirp is sampled M times, there will be M columns in the matrix. The transformation of the data matrix in range and velocity matrices will now be described.

Figure 5A:
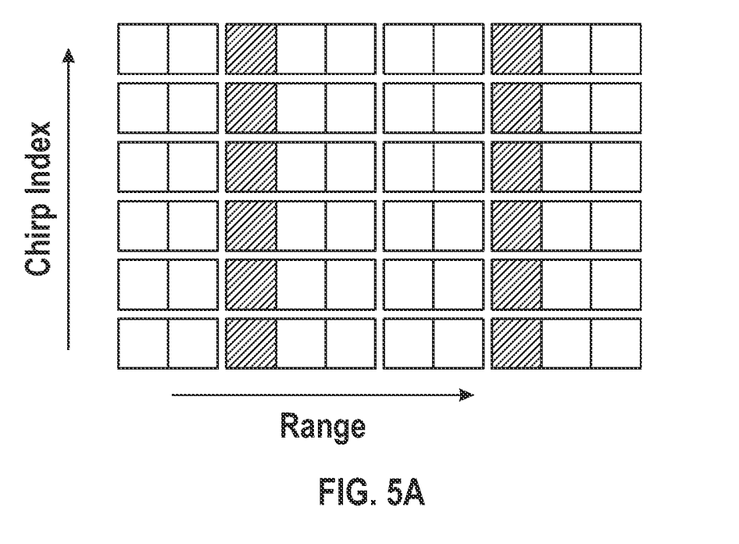
FIGS. 5A and 5B illustrate the creation of a velocity-range array from a chirp index-range array, according to some embodiments.

FIG. 5A illustrates the creation of a chirp-range matrix from the previous data matrix, according to some embodiments. As mentioned above, each row corresponds to samples from a specific chirp. To determine range(s), a range-FFT is performed on each row. A fast Fourier transform (FFT) is an algorithm that computes the discrete Fourier transform (DFT) of a sequence, or its inverse (IDFT). Fourier analysis converts a signal from its original domain (often time or space) to a representation in the frequency domain and vice versa.

The application of the range-FFT resolves objects in range. As one skilled in the art can appreciate, the x-axis is actually the frequency corresponding to the range FFT bins. But, since range is proportional to the IF frequency, this can be plotted directly as the range axis. Therefore, FIG. 5A is a matrix of chirps with each chirp having an array of frequency bins. Pursuant to the discussion above, these bins correspond directly to the range via the IF.

Figure 5B:
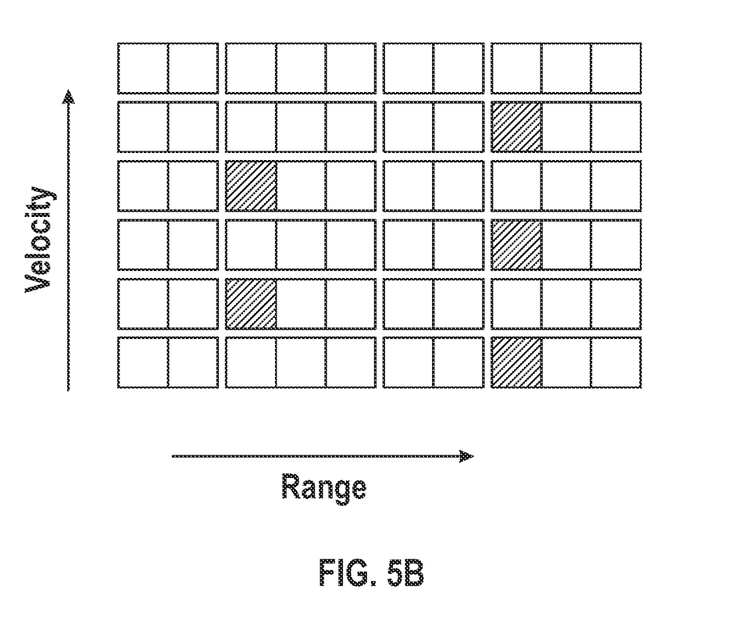

FIG. 5B illustrates the creation of a velocity-range matrix from the previous chirp index-range matrix, according to some embodiments. A Doppler-FFT is performed along the columns of these range-FFT results shown in FIG. 5A. This resolves objects in the velocity dimension.

As can be appreciated, FIG. 5B depicts two objects in the third range bin traveling at two different speeds. Similarly, there are three objects in the eighth range bin traveling at three different speed. It should be noted that these are accurate for a fixed range-angle. Angle determination will now be discussed in greater detail.

Figure 6:
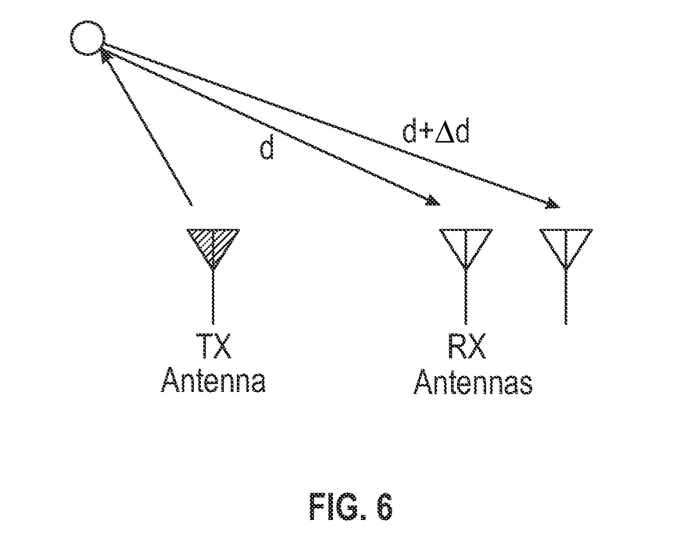
FIG. 6 depicts an exemplary antenna array used to calculate angle, according to some embodiments.

FIG. 6 depicts an exemplary antenna array used to calculate angle, according to some embodiments. Angle estimation requires at least 2 receiver (RX) antennas. The differential distance of the object to each of these antennas is exploited to estimate distance. So, the transmit (TX) antenna transmits a signal that is a chirp. It is reflected off the object with one ray going from the object to the first RX antenna and another ray going from the object to the second RX antenna.

In this example depicted in FIG. 6, the ray to the second RX antenna has to travel a little longer. That is, an additional distance of delta d. This additional distance results in an additional phase of omega equal to 2 pi delta d by lambda. So, this is the phase difference between the signal at this antenna and the signal at this antenna.

Figure 7:
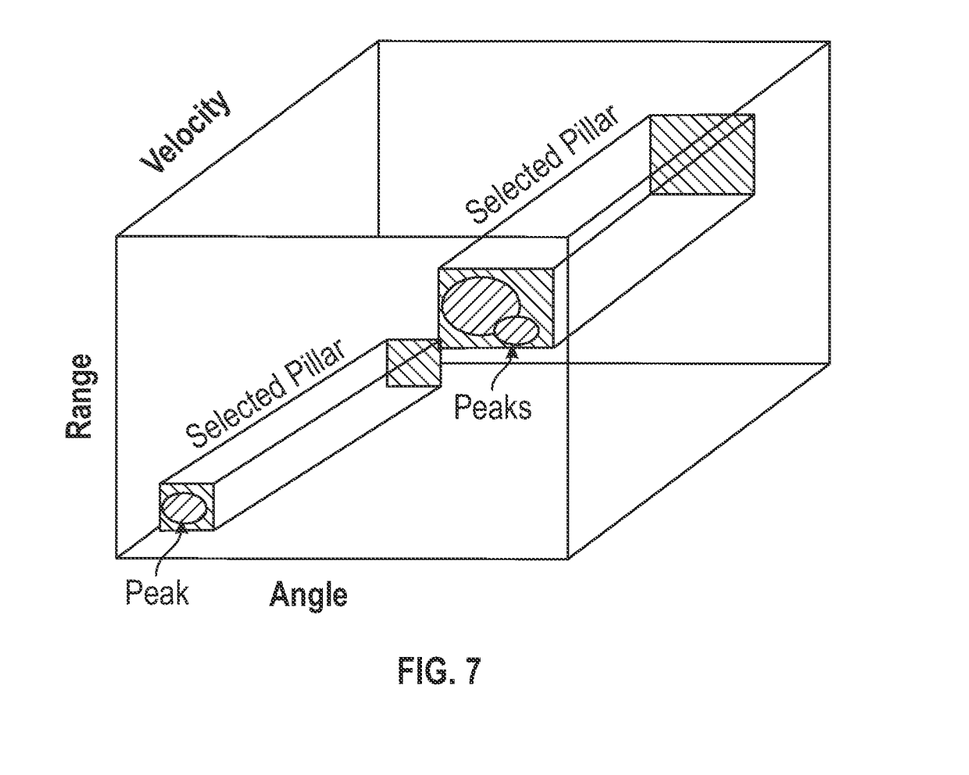
FIG. 7 depicts an exemplary range-angle-velocity radar cube, according to some embodiments.

FIG. 7 depicts an exemplary range-angle-velocity radar cube, according to some embodiments. As can be appreciated by one skilled in art, the assembly of the matrices result in a 3D radar cube with axes of range-angle-velocity. Methods disclosed herein describe techniques for processing and interpreting radar data extracted from one (or more) 77-GHz DigiMMIC (FMCW) radar sensor mounted on a moving vehicle, although other frequencies and applications are not beyond the scope of the present disclosure.

The radar cube data is in the form of 3-dimensional, complex-valued array with dimensions corresponding to azimuth (angle), radial velocity (doppler), and radial distance (range). Magnitude in each angle-doppler-range bin is taken to describe how much energy the radar sensor sees coming from that point in space (angle and range) for that radial velocity. For demonstrative purposes, linear antenna arrays oriented parallel to the ground are assumed. Pillars with peak energies can be selected for peak validation, which will be discussed later in the disclosure.

Figure 8A:
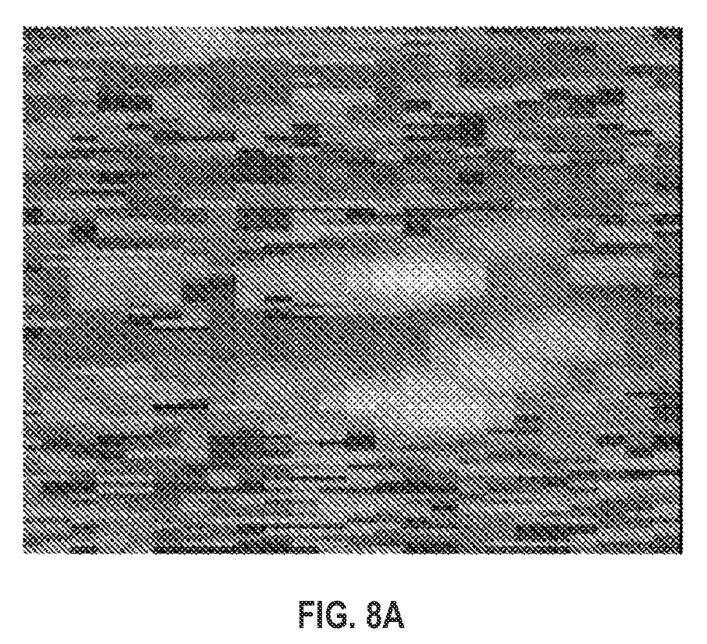
FIGS. 8A and 8B depict a scene before and after image processing, according to some embodiments.
Figure 8B:
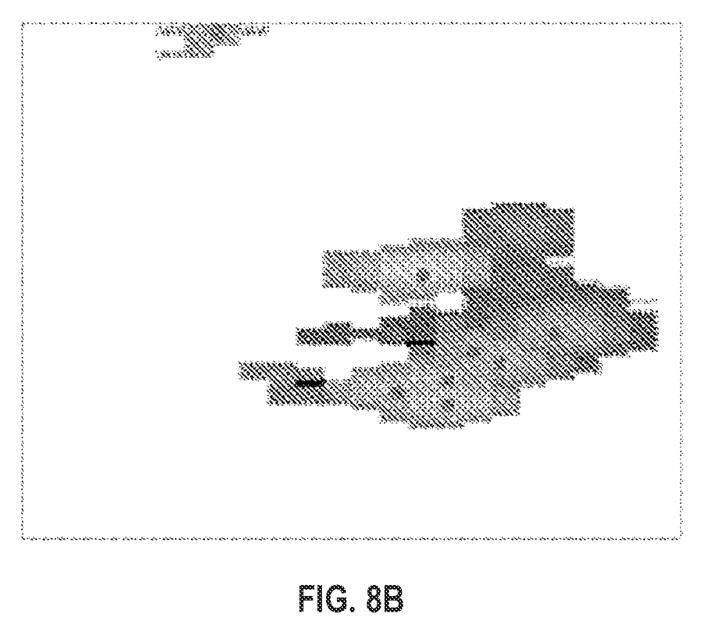

FIGS. 8A and 8B depict a scene before and after image processing, according to some embodiments. An object of present disclosure is foreground extraction/background subtraction. FIG. 8A is the raw image of a car in a radar cube. From the relatively noisy image depicted in FIG. 8A, distinct peak energy regions can be extracted. The high-level idea is to isolate reflections off of objects in an automotive scene by combining background noise estimation with peak region masking. The former finds regions in the radar signal that stand out from the background and the latter validates and isolates them for further processing.

The result is depicted in FIG. 8B. FIG. 8B is a processed image of a car in a radar cube with detected peaks (dots) and peak regions (non-black pixels). The process of which will now be discussed in greater detail.

Foreground extraction can be performed by various methods for suppressing noise and artifacts and extracting salient regions of a radar cube. Most, if not all, involve estimating either a background model and somehow removing it or creating a mask that emphasizes desired bins and suppresses others through element-wise multiplication.

CFAR Constant False Alarm Rate (CFAR) thresholding is probably the most well-known and well-studied technique and involves estimating a background model through local averaging. Constant false alarm rate (CFAR) detection refers to a common form of adaptive algorithm used in radar systems to detect target returns against a background of noise, clutter and interference.

The primary idea is that noise statistics may be non-uniform across the array. CA-CFAR (cell averaging) computes a moving mean while excluding a region at the center of the averaging window (guard cells) to avoid including a desired object in the background estimate. OS-CFAR (order-statistic) does the same computation but with a percentile operation instead of a mean. Given the background model (estimate of background value in each bin) $b_{ijk}$, the foreground can be estimated as:

$$\forall i,j,k \; x_{ijk} \leftarrow x_{ijk} \odot (x_{ijk} \geq \alpha \cdot b_{ijk}) \quad (1)$$

for some factor $\alpha$ that controls the amount of background suppression.

One or more objects of the present disclosure is to efficiently isolate objects in an automotive scene from noise. The motivation(s) being that automotive radar signals consist of reflections off of objects (e.g., cars, cyclists, buildings) and that traditional approaches may not simultaneously achieve accuracy, efficiency, and usability in a machine learning pipeline.

Heretofore, previous solutions have attempted 2D-only or full 3D background estimation. Other solutions don't include peak validation or retention of peak regions.

Solutions to similar problems in related fields and other disciplines are untenable in their application to 3D radar data cubes. They also create barriers to computational efficiency.

Figure 9:
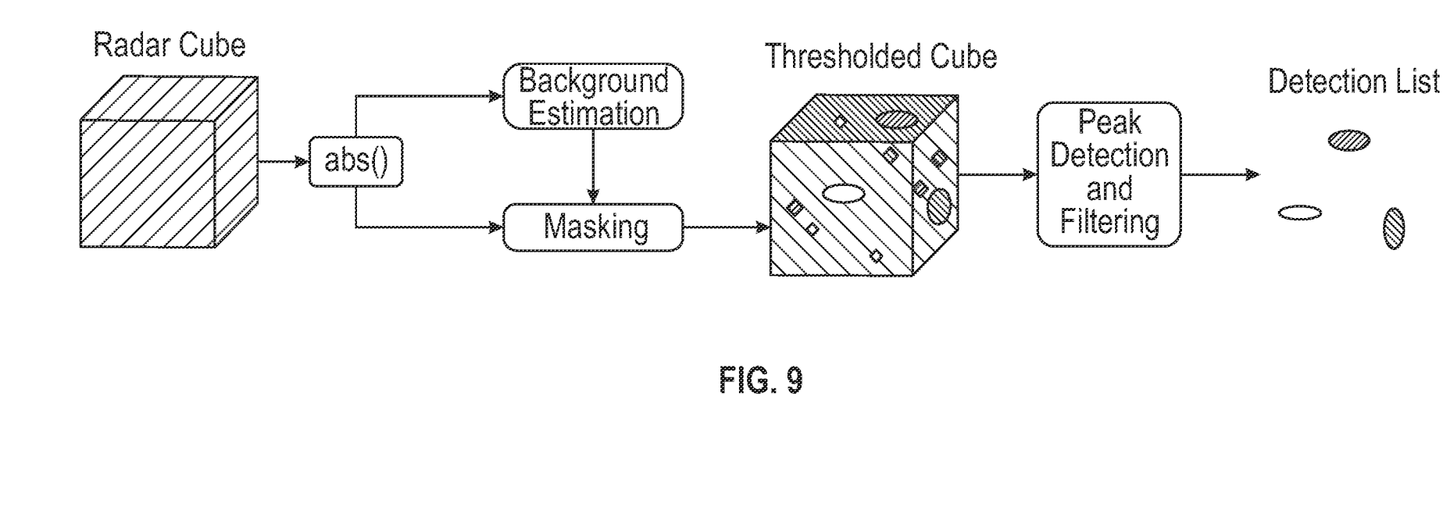
FIG. 9 is an exemplary method for detecting objects in automotive-grade radar, according to some embodiments.

FIG. 9 is an exemplary method for detecting objects in automotive-grade radar, according to some embodiments. The method comprises medmed background modeling. Medmed refers median-median, although other averaging techniques are not beyond the scope of the present disclosure. A median is a value in an ordered set of values below and above which there is an equal number of values or which is the arithmetic mean of the two middle values if there is no one middle number.

The OS-CFAR described above is expensive and a bit inflexible because it operates on the full radar cube. This implementation can be improved without significantly affecting the result as follows. For demonstrative purposes, it is assumed that the background model is only a function of range-angle and not doppler. By doing so, a full 3D moving median can be approximated with a median over doppler followed by a 2D moving median over range-angle.

This allows much more flexibility in terms of choosing (2D) window size and overlap. The moving median on a sparse grid can be calculated and quickly upsampled to the original range-angle grid with widely used and optimized image resampling techniques. The two median operations give this approach its name.

Turning to FIG. 9, the radar cube comprises a large amount of data which includes both background and energy clusters. These energy clusters or clouds may be regions of interest which are confirmed during peak detection. However, before that can occur, some of the capacious background need to be removed (subtracted) in order to have a tractable data cube which can be more efficiently processed.

Typically, in the art, aggressive thresholding is applied to a radar cube, which compresses the data by effectively throwing away a large amount of information, i.e., the data under the threshold. Image thresholding is a simple, yet effective, way of partitioning an image into a foreground and background. This image analysis technique is a type of image segmentation that isolates objects by converting gray-scale images into binary images. Image thresholding is most effective in images with high levels of contrast.

By thresholding less aggressively, a larger area of surrounding regions could be kept. This is useful in intelligent perception analysis. Constructive perception or intelligent perception is the theory of perception in which the perceiver uses sensory information and other sources of information to construct a cognitive understanding of a stimulus. In contrast to this top-down approach, there is the bottom-up approach of direct perception. Perception is more of a hypothesis, and the evidence to support this is that "Perception allows behavior to be generally appropriate to non-sensed object characteristics," meaning that we react to obvious things that, for example, are like doors even though we only see a "long, narrow rectangle as the door is ajar."

In the present embodiment, intelligent perception not only allows a radar system to identify an object's (let's say car) position, speed and direction, it can dispositively associate that with a previously identified car. That is, the radar system can more easily temporally correlate object between scenes thereby mitigating surprises.

In one or more embodiments, a fourth dimension includes tangential velocity. In state-of-the-art radar systems, doppler can only resolve a velocity which is closer to the observer. That is, closer and further from the radar antenna. In some embodiments, tangential velocity can resolve velocities substantially normal to the plane of the observer. In more layman's term, this includes left-right or up-down movement and speed (actually velocity, since it is a vector). A 4D radar cube can be referred to as a tesseract.

Turning back to FIG. 9, the absolute value operation is performed on the radar cube. As is known, absolute value returns the magnitude of a complex number which is simply the distance from the origin in the complex plane. In one or more embodiments, a median is performed to achieve some thresholding standard. A moving median is desirable as a more robust statistic of averaging as the mean can get thrown off by objects which are heavily weighted. That is, median can ignore high energy objects in the scene. This is important in the background subtraction step.

However, medians are computationally intensive since they require sorting. If the background is assumed to be independent of the radial velocity direction, one dimension of the radar cube can be truncated by the following. A moving median is performed of the radial velocity direction. This median can then be used to reduce the 3D radar cube to just range-angle by substituting the velocity median in the third dimension. The importance of which will be described in more detailed in the discussion of FIG. 10.

Once background estimation is achieved, masking can be performed. Masking removes any background noise while allowing peak regions of interest to remain. The result is a threshold cube which is computationally far more tenable. Peak detection and filtering can now be performed which will also be discussed later in the disclosure.

An aspect of the radar cube processing includes using short-term track hypotheses (referred to as "tracklets") to model detections. Tracklets are clustered into groups to form longer-term tracking hypotheses (referred to as "groups"). The tracklets and groups are subject to birth-death rules and different filters, as discussed below.

The peak list can then be processed with different state of the art filtering and detection methods. These methods do not take into account the small variation of the reflection points from measurement to measurement. For example, a reflection point on a curved surface of an object like a car hood can change its position depending on orientation and position of the car. This movement of the reflection point then adds an artificial movement not corresponding to the real movement of the object. It becomes difficult to associate all the reflection points to the same object due to this offset. Further, as the object moves, new reflection points on the object show up and others vanish. To mitigate this problem, the following novel techniques are used.

As a first step a short-term hypothesis is used to model the dynamic/short-term movement of each detection from frame to frame. The tracked/filtered detections are the previously referenced tracklets. As a next step, several tracklets (minimum one, but preferably a larger number than 1) are clustered. This cluster is then tracked by a long term hypothesis to model the underlying movement of the object. The individual tracklets and groups are preferably modeled with alpha/Beta Kalman Filter rules and with birth and death rules. Kalman filters use a series of measurements observed over time to produce estimates of unknown variables that tend to be more accurate than those based on a single measurement alone. The accuracy is attributable to joint probability distribution over the variables for each timeframe. An example for a birth rule is that a reflection has to be present in a number of frames, e.g. 3, to be tracked as a tracklet. Similar, a death rule embodiment is that the corresponding detection of the tracklet has to miss in 3 consecutive frames for the tracklet to die. The technical advantage of this method is that the new and/or vanishing reflection points are modeled accurately, yet small fluctuation are compensated. Similar techniques are used for the objects (grouped or clustered tracklets) to be present in the scene/entering the scene/leaving.

It is advantageous to use filters with no constraints on the movements for the short-term hypothesis filtering, e.g. using a hoovercraft object motion filter for the short-term hypothesis filter. For the long-term hypothesis filter it is preferred to use filters with a more confined motion model, e.g. a vehicle motion model.

Figure 10:
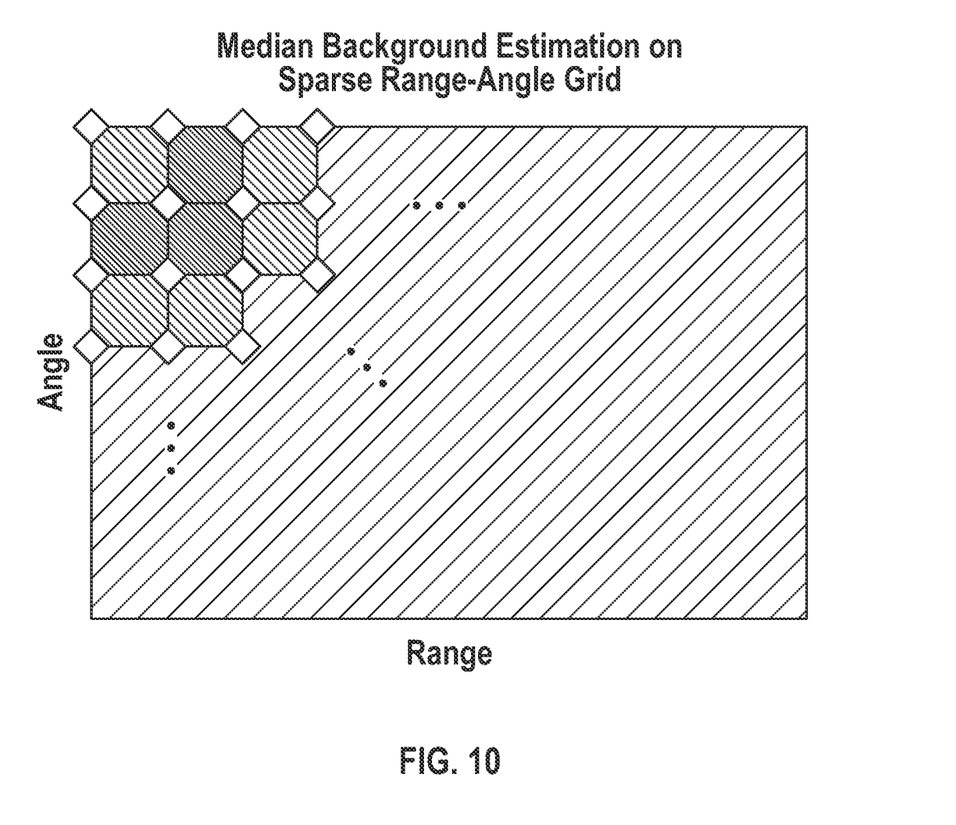
FIG. 10 depicts an exemplary median background estimation on a sparse range angle grid, according to some embodiments.

FIG. 10 depicts an exemplary median background estimation on a sparse range angle grid, according to some embodiments. Pursuant to previous discussion, background estimation can be performed on range-angle with the use of velocity (doppler) median. Median background estimation on sparse range-angle grid comprises a moving median over a 2D grid.

In some embodiments, median background estimation on sparse range-angle comprises sorting a median over eight points surrounding an origin of a square in question. In other embodiments, any number of two-dimensional points can be used. In yet other embodiments, over averaging metrics can be utilized and remain within the scope of the present disclosure.

Peak detection, thresholding and validation is disclosed as follows. Thresholding does most of the work of extracting foreground regions in the radar cube, but it is not perfect. Some spurious peaks rise above the threshold. These can be removed by assuming that all regions of interest are well-described as 3-dimensional blob shapes. This consists of finding all local maxima via:

$$p_{ijk} = \begin{cases} 1 & \text{if } x_{ijk} = \max(x_{i-1:i+1, j-1:j+1, k-1:k+1}) \text{ and } x_{ijk} > 0 \\ 0 & o.w. \end{cases} \quad (5)$$

and scoring these peaks as the sum of magnitudes within a 5×5×5 neighborhood centered on each bin and then masking out peak regions whose scores are below a minimum value. This can reduce the number of local maxima from 100s-1,000s to 30-100.

The utility of the aforementioned is robustness in that spurious peaks are eliminated by the validation step. Additionally, usability is augmented by peak regions (rather than just the peaks) which can be used by a machine learning engine later in the pipeline.

While one or more of the previous embodiments entail performing a median operation over the velocity degree of freedom, the operator can be performed on any parameter in order to simply (compress) data for further analysis. For example, medians or other averages (moving or otherwise) can be used on range, angle, and/or tangential velocity, in order to attenuate the data matrices.

Figure 11:
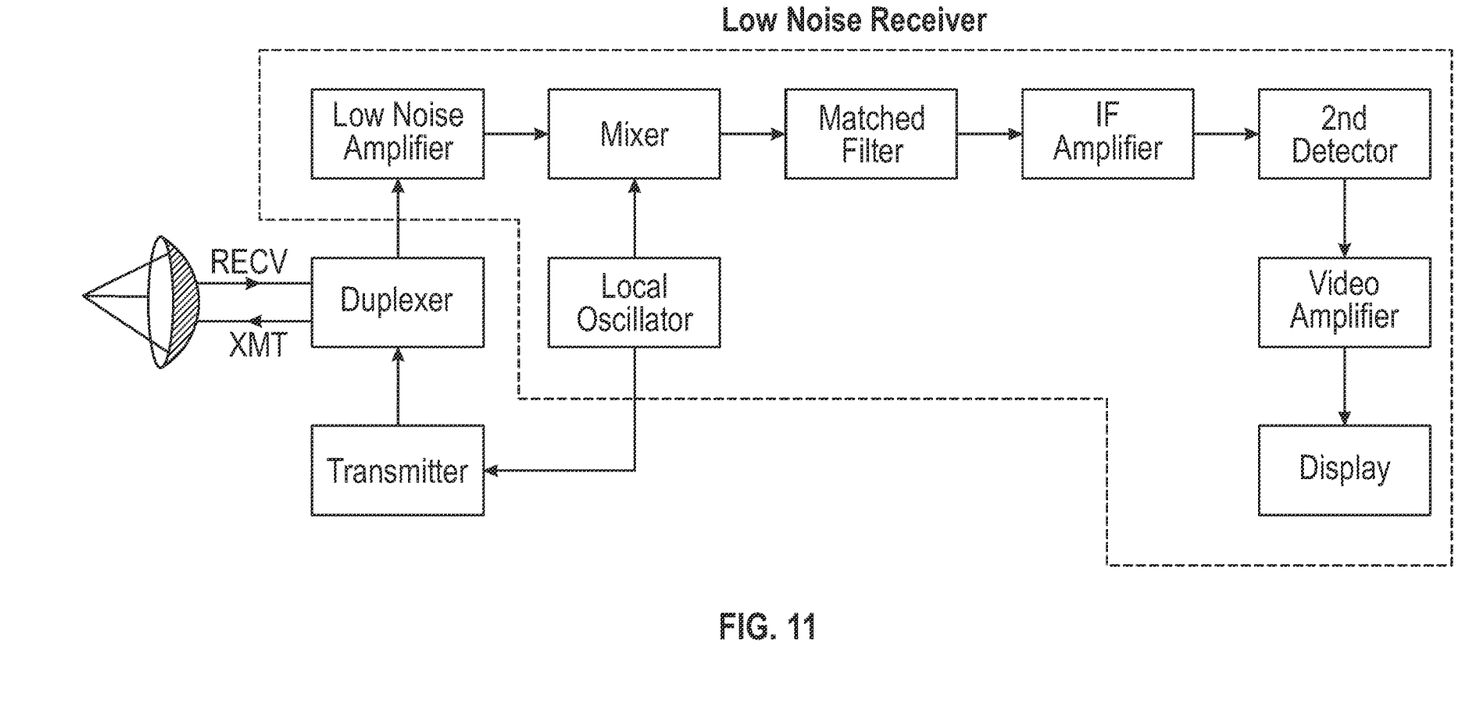
FIG. 11 is a schematic of an exemplary radar system, according to some embodiments.

FIG. 11 is a schematic of an exemplary radar system, according to some embodiments. The radar system comprises transmitter, duplexer, low noise amplifier, mixer, local oscillator, matched filter, IF filter, $2^{nd}$ detector, video amplifier and display.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The invention claimed is:

1. A machine-implemented method, comprising:
    collecting radar signals reflected from objects in a field of view using a receiver circuit;
    forming a digital representation of the collected radar signals using an analog-to-digital converter circuit;
    using the digital representation of the collected radar signals, forming range-angle-doppler bins representing three-dimensional objects in the field of view;

approximating a three-dimensional median filtering operation by:
(1) applying a one-dimensional moving median filter across a doppler dimension of the range-angle-doppler bins to suppress background noise in the range-angle-doppler bins in a first dimension;
(2) applying a mask to suppress doppler values from the one-dimensional moving median filter corresponding to low energy peak regions to form a sparse range-angle two-dimensional grid; and
(3) applying a two-dimensional moving median filter to a remaining two dimensions of the range-angle-doppler bins comprising range and angle dimensions in the sparse range-angle two-dimensional grid.

2. The machine-implemented method of claim 1 further comprising validating peak regions of the range-angle-doppler bins by applying a threshold corresponding to magnitudes of values neighboring a peak region.

3. The machine-implemented method of claim 1 further comprising up-sampling remaining sparse range-angle two-dimensional grid values with bilinear interpolation.

4. The machine-implemented method of claim 1 wherein the mask is defined by a magnitude threshold including suppressing peak regions below the magnitude threshold.

5. The machine-implemented method of claim 4 wherein the magnitude threshold is determined adaptively.

6. The machine-implemented method of claim 1 wherein the radar signals reflected from objects in the field of view are processed to extract reflection point detections.

7. The machine-implemented method of claim 6 further comprising applying first tracking rules to the reflection point detections to form tracklets corresponding to respective track hypotheses, where each tracklet corresponds to a reflection point detection tracked over several frames.

8. The machine-implemented method of claim 7 further comprising establishing a cluster of tracklets and applying second tracking rules implemented using a filter corresponding to a vehicle motion model to the cluster of tracklets to track objects having several reflection point detections.

9. The machine-implemented method of claim 8 wherein a birth of a tracklet is established by a presence of a reflection in a specified count of frames.

10. The machine-implemented method of claim 8 wherein a death of a tracklet comprises suppressing further recognition of the tracklet in an absence of a reflection in a specified count of frames.

11. The machine-implemented method of claim 8 further comprising applying a Kalman filter to establish an estimate of an unknown parameter corresponding to a tracklet.

12. A system, comprising:
a synthesizer circuit coupled to a transmitter configured to emit radar signals towards objects in a field of view;
a receiver configured to collect radar signals reflected from the objects in the field of view;
an analog-to-digital converter (ADC) circuit coupled to the receiver and configured to form a digital representation of the collected radar signals; and
a processor circuit coupled with a memory circuit, the memory circuit comprising instructions that, when executed by the processor circuit, cause the system to:
form range-angle-doppler bins representing three-dimensional objects in the field of view using the digital representation of the collected radar signals;
approximate a three-dimensional median filtering operation by:
(1) applying a one-dimensional moving median filter across a doppler dimension of the range-angle-doppler bins to suppress background noise in the range-angle-doppler bins in a first dimension;
(2) applying a mask to suppress doppler values from the one-dimensional moving median filter corresponding to low energy peak regions to form a sparse range-angle two dimensional grid; and
(3) applying a two-dimensional moving median filter to a remaining two dimensions of the range-angle-doppler bins comprising range and angle dimensions in the sparse range-angle two-dimensional grid.

13. The system of claim 12, wherein the instructions comprise instructions to validate peak regions of the range-angle-doppler bins by applying a threshold corresponding to magnitudes of values neighboring a peak region.

14. The system of claim 12, wherein the instructions comprise instructions to up-sample remaining sparse range-angle two-dimensional grid values with bilinear interpolation.

15. The system of claim 12, wherein the mask is defined by a magnitude threshold including suppressing peak regions below the magnitude threshold.

16. The system of claim 15, wherein the magnitude threshold is determined adaptively.

17. The system of claim 12, wherein the instructions comprise instructions to apply a Kalman filter to establish an estimate of an unknown parameter corresponding to a tracklet, the tracklet established from application of a track hypothesis to a reflection point detection tracked over several frames.

18. The system of claim 17, wherein the instructions comprise instructions to establish a cluster of tracklets and applying tracking rules to the cluster of tracklets to track objects having several reflection point detections, the tracking rules implemented using a filter corresponding to a vehicle motion model.

* * * * *